March 23, 1937.  W. B. DEAN  2,074,891
RAIL CAR TRUCK
Filed Jan. 27, 1934
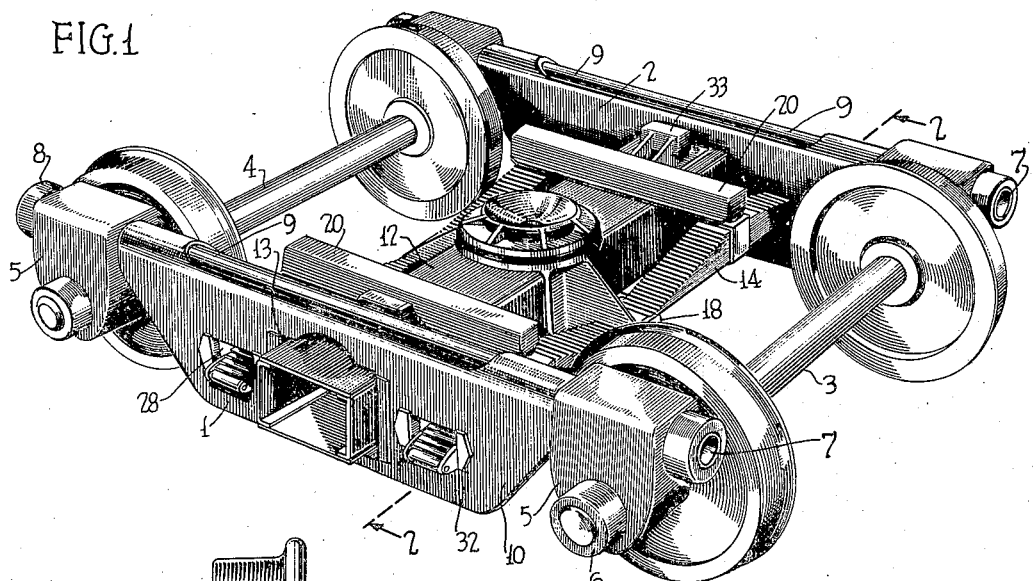
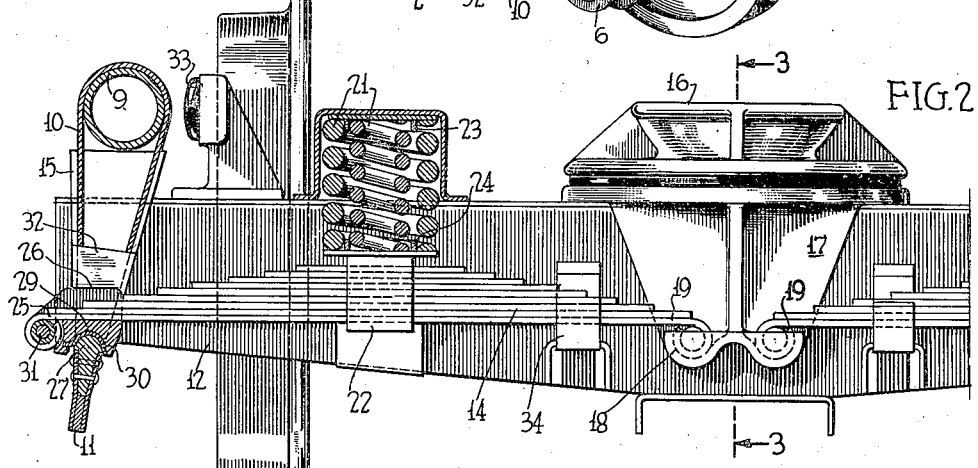
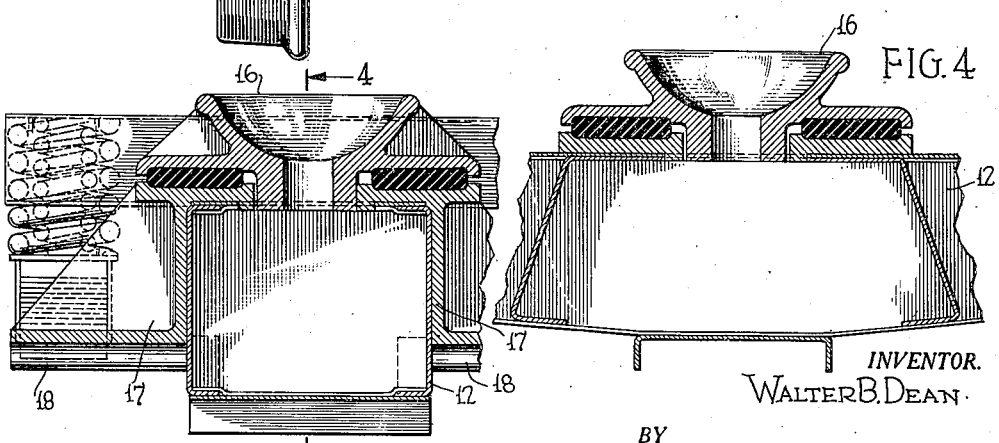
INVENTOR.
WALTER B. DEAN·
BY
John P. Darby
ATTORNEY.

Patented Mar. 23, 1937

2,074,891

UNITED STATES PATENT OFFICE 2,074,891

RAIL CAR TRUCK

Walter B. Dean, Narberth, Pa., assignor to Edward G. Budd Manufacturing Co., Philadelphia, Pa., a corporation of Pennsylvania Application January 27, 1934, Serial No. 708,557

11 Claims. (Cl. 105—190)

The present invention relates to railway trucks and has for its main object the provision of a light flexible truck with swinging bolster especially adapted for use on light rail cars, and which may be readily assembled and disassembled, or partly disassembled for replacement of parts, together with sturdiness, simplicity of structure, and minimum number of parts, certain parts being made to serve two or more functions.

Another object is to provide a truck of the above general type which shall be flexible in a manner to equalize the wheel loads in spite of irregularities which may occur in the track, and at the same time maintain wheel alignment.

The bolster is made capable of lateral swing, but is so suspended as to be held firmly against longitudinal swing or other longitudinal movement with respect to the truck. Arrangement of parts is such that the side swing of the bolster is damped by weight of the car thus doing away with special damping means.

The above and other objects of the invention will be apparent from a perusal of the following specification and the drawing accompanying the same.

In the drawing:

Fig. 1 is a perspective view of a preferred embodiment of the invention.

Fig. 2 is a fragmentary vertical transverse section taken on a plane just forward of the leaf springs in Fig. 1 as indicated by the section line 2—2 on Fig. 1, and slightly enlarged with the side bearing of the leaf springs and the coil spring bearing shown in section.

Fig. 3 is a fragmentary section taken on the line 3—3 of Fig. 2.

Fig. 4 is a fragmentary section taken on the line 4—4 of Fig. 3.

Referring to the drawing in detail, it will be seen that the main bolster frame is formed by side beams 1 and 2, and front and rear axles 3 and 4 joined together through journal boxes 5. The wheel shafts 3 are journaled in the journal boxes 5 and held therein in any suitable manner, as by retaining collars 6, while the side beams 1 and 2 are secured to the front and rear journal boxes through tubular trunnions 7 held in place by trunnion collars 8. The upper portion of each side beam is comprised of a straight tube member 9 extending between and through the journal boxes, the ends of the member 9 forming the tubular trunnions 7. This tubular member 9 forms a compression member for the beam, the central and bottom portions of which are formed by a folded web of heavy sheet metal 10, looped around the tubular compression member 9 and secured together along the bottom edges of the loop through a filler strip 11, by riveting, spot welding or the like, which filler strip acts as part of the tension member of the beam. The side beams thus form with the wheel axles a rectangular truck frame with swinging side members, but fully capable of maintaining the wheels in alignment. A bolster beam 12 of hollow box section extends across the truck through apertures 13 in the side beams and is supported on the side beams through leaf spring assemblies 14 carried by the bolster beam and arranged to bear through their outer ends on the side beams at either side of the apertures 13, the apertures 13 being so proportioned in relation to the ends of the bolster beam as to leave sufficient clearance above and below the bolster beam to permit vertical movement of the bolster beam in relation to the side beams under normal operation without engaging the top and bottom sides of the apertures. The sides of the apertures are provided with wear plates 15, to take the wear of the bolster beam, their horizontal spacing being such as to act as vertical guides for the bolster beam restraining it to move in a vertical plane. The bolster beam carries a bogie center pivot casting 16 with side brackets 17 extending down either side of the beam and carrying spring pockets 18 into which the inner ends 19 of the leaf spring assemblies 14 are nested.

The bolster beam is supported on the springs by means of the bolster yokes 20 which are in the form of downwardly facing flanged channel beams extending transversely across the bolster beam one near each end and secured thereto through their flanges, in any suitable manner, as by spot welding, riveting or the like.

The bolster yokes bear at their ends on the central portions of the leaf spring assemblies 14 through auxiliary coil springs 21 seated in the ends of the bolster yokes, and bearing on top of the spring yokes 22 which bind the leaf spring assemblies together. The coil springs 21 are held in alignment and suitably seated with respect to the spring assembly and the bolster yoke by the upper and lower centering ring members 23 and 24 secured respectively to the bottoms of the ends of the yokes 20 and the tops of the spring yokes 22.

The outer ends 25 of the leaf springs 14 bear on the side beams through a trough bearing member 26 carried on the ends of the springs, and a complementary ridge bearing 27 carried by the side beam, the two bearing members acting somewhat in the manner of a knife edge bearing, but with bearing surfaces rounded instead of in the form of a sharp edge and V-trough.

The ridge member 27 is in the form of a short bar of wedge shape cross section seated between the metal web members at the lower edge of apertures 28 in the side beams and riveted in place as shown in Fig. 2.

The trough bearing member 26 is provided with a depression or trough 29 to receive the upper edge of the ridge member 27, which trough is lined with a bushing plate 30 of suitable material capable of giving long wear, preferably stainless steel, which has the quality of becoming harder with wear of the kind to which the present bearing is subjected. A pintle 31 secures the end 25 of the leaf spring assembly to the trough bearing 26.

The sides of the apertures 28 are protected against wear by side bushing plates 32. Buffers 33 are mounted near the top ends of the bolster beam in a position to be normally out of engagement with the side beams, but to engage the latter upon predetermined side movement of the bolster beam in relation to the side beams to limit the extent of such side movement.

To guard the spring assemblies from dropping away in case of breakage at the inner ends, safety catches 34 are provided which fit around the bottom and sides of the spring assemblies near the inner ends, and are secured to the bolster beam so as to catch and hold the spring assembly in case of breakage.

From the above description it will be clear that in operation, the bolster beam will be supported on the side beams wholly through the outer ends of the leaf spring assemblies and will be constrained to move in a vertical plane by engagement of the bolster beam with the sides of the apertures 13 in the side beams. Side swing of the bolster beam is permitted by the pivotal mounting of the side beams on their trunnions in the journal boxes, and by the trough and the ridge bearing connection between the supporting springs and the side beams, which swinging motion is limited by the buffer elements 33.

As will be clear from Fig. 2, the side beams are normally canted outwardly which improves the riding quality and tends to damp the swinging motion before the buffer 33 engages the side beams. Minor shocks and vibrations will be absorbed by the coil springs 21 while the vibrations of slower period are absorbed and damped out by the four cantilever leaf spring assemblies, the leaf springs being so arranged and proportioned as to be straight when in the loaded position and thus act as column members to hold the truck in alignment.

It will be noted that the side beams are of very efficient section for the stresses imposed upon them, the steel tube member forming the top portion of the beam affording a strong chord member while an effective tension chord member is formed by the folded piece of sheet metal joined together at the bottom edge through the filler member 11.

It will also be noted that the four leaf spring assemblies take the place of the transom employed in the conventional truck, and that because of their wide four point spacing they act to hold the truck in alignment without detracting from its flexibility. Thus while the wheels are held securely in alignment, the truck is equalized and maintained sufficiently flexible to compensate for irregularities in the track. For example, due to the rectangular relation between the side frame trunnions and the axle bearings, any one wheel may be raised considerably without throwing the other wheels out of alignment.

The truck may be used as a motor truck by suspending the motor from the axle in a manner well known in the art except that the nose of the motor would be supported from the bolster beam by a suitable swing link to allow lateral swinging of the bolster without interference with the motor support.

While I have thus shown and described a specific embodiment of the invention for the sake of disclosure, it is to be understood that the invention is not limited to such specific embodiment but contemplates all such modifications and variations thereof as fall fairly within the scope of the appended claims.

What I claim is:

1. In a railway truck, journal boxes, a pair of swinging side beams each journaled in and between a pair of said journal boxes each on one side of the truck, a bolster beam, and leaf springs serving as lateral thrust transmitting means connecting the bolster beam with the said swinging side beams.

2. In a railway truck, a pair of wheel axles, journal boxes for the axles, a pair of swinging side beams having their ends pivotally mounted in said journal boxes, a bolster beam, and leaf springs serving as lateral thrust transmitting means connecting the opposite sides of the bolster beam to said side beams at points below the level of the axes of the pivotal mounting of said side beams.

3. In a railway car truck the combination comprising journal boxes, side beams connecting said journal boxes and journaled therein at right angles to the wheel axles, a bolster beam extending through openings in said side beams, and resilient supporting means carried by said bolster and hingedly connected to said side beams and transmitting the transverse thrusts from the bolster to the side beams.

4. In a railway truck the combination comprising a pair of wheel axles, journal boxes for the axles, a pair of side drop beams each pivotally supported at its ends near the top in the front and rear journal boxes on one side of the truck, a bolster beam extending through openings in said side beams, two pairs of leaf springs carried by the bolster beam, said pairs being arranged on opposite sides of its center, the springs of each pair on opposite sides of the bolster being hingedly connected with the side beams to connect and resiliently support the bolster on the side beam.

5. In a railway truck a pair of wheel axles, journal boxes supported by said wheel axles, a pair of side beams supported by said journal boxes through bearings permitting the beams to swing laterally, a bolster, spring means connecting the bolster with the side beams to transmit the lateral thrusts of the bolster to the beams, guide means restricting the movement of the bolster to a vertical plane, and means limiting the lateral movement of the bolster with respect to the side beams.

6. In a railway truck a pair of wheel axles, journal boxes supported by said wheel axles, a pair of side beams supported by said journal boxes through bearings permitting the beams to swing laterally, a bolster, spring means connecting the bolster with the side beams to transmit the lateral thrusts of the bolster to the beams, guide means restricting the movement of the bolster to a vertical plane, means limiting the vertical movement of the bolster beam with respect to the side beams and means limiting the lateral movement of the bolster with respect to the side beams.

7. In a railway truck, a pair of wheel axles, journal boxes for the axles, a pair of side beams joining the front and rear axles each pivotally supported at its ends on the front and rear journal boxes on one side of the truck, a bolster, leaf springs connecting the bolster with the side beams at two points on each side beam substantially equally spaced on either side of the center of the beam.

8. In a railway truck, a pair of wheeled axles, journal boxes for said axles and a pair of side beams joining the journal boxes to form a truck frame, a bolster carried between the wheeled axles adapted for relative transverse movement with respect to the truck frame, each of said side beams including a shaft and a swinging side member, said side member being pivotally mounted with respect to said journal boxes and secured to said bolster.

9. In a railway truck a pair of wheeled axles and a pair of side beams joining the ends of the axles to form a truck frame, said side beams having members pivotally mounted to swing laterally of the truck frame, a bolster beam supported by said side beams through bearing connections to swing with said side beam members, and means on said bolster to limit excessive movement of the bolster.

10. A railway truck comprising a pair of axles, journal boxes for said axles, longitudinally extending members joining said journal boxes and side frames each swingingly supported with respect to its respective longitudinally extending member, and a bolster yieldably supported from said side frames, and connected to them, said bolster being free to swing with respect to the longitudinally extending members.

11. A railway truck comprising a pair of axles, a swinging bolster between said axles, journal boxes for said axles, longitudinally extending members joining said journal boxes, and side frames suspended from said members, each of said side frames including a continuous sheet folded over its respective longitudinally extending member and depending therefrom, said members being pivotally mounted in said journal boxes, and means on said sheets to receive and support the bolster.

WALTER B. DEAN.